United States Patent [19]

Mastromatteo

[11] Patent Number: 4,535,613
[45] Date of Patent: Aug. 20, 1985

[54] T-TOP LOCK-HANDLE

[76] Inventor: Frank J. Mastromatteo, 6150 Ironside Dr., Centerville, Ohio 45459

[21] Appl. No.: 409,627

[22] Filed: Aug. 19, 1982

[51] Int. Cl.³ .............................................. E05B 13/10
[52] U.S. Cl. ...................................... 70/221; 70/224; 70/DIG. 31; 70/DIG. 39; 70/DIG. 67
[58] Field of Search ................. 70/221, 218, 219, 220, 70/224, 201, 204, 207, 208, DIG. 9, DIG. 31, 422, DIG. 67, DIG. 39; 296/224; 292/349, 359

[56] References Cited

U.S. PATENT DOCUMENTS

| 499,257 | 6/1893 | Schulhoff | 70/422 |
| 958,815 | 5/1910 | Markham | 70/222 |
| 1,308,521 | 7/1919 | Butter | 70/422 |
| 2,164,486 | 7/1939 | Andrie | 292/349 |

FOREIGN PATENT DOCUMENTS

| 1147327 | 6/1957 | France | 70/218 |
| 538446 | 1/1956 | Italy | 70/221 |

Primary Examiner—Robert L. Wolfe
Attorney, Agent, or Firm—Joseph P. Burke

[57] ABSTRACT

This disclosure is directed to a key-activated, handle-operated three way (position) locking mechanism for removable automobile, or other vehicle, roof panels of the type wherein the handle customarily pivots from locked to open (unlocked) positions to permit removal of the roof "T-top" panels. The "T-top" lock-handle device of this invention comprises a latch stud adapter mechanism and locking cam mechanism each located substantially within a handle-housing and operative to permit locking and unlocking over a three position arc for the lock and a two position arc for the handle-housing and wherein unlocking is effected by meshing of notched surfaces on said adapter and locking cam whereby the locking cam drives the adapter upon rotation of the handle to unlock the "T-top" permitting its removal from the automobile roof.

7 Claims, 11 Drawing Figures

U.S. Patent  Aug. 20, 1985  Sheet 1 of 4  4,535,613
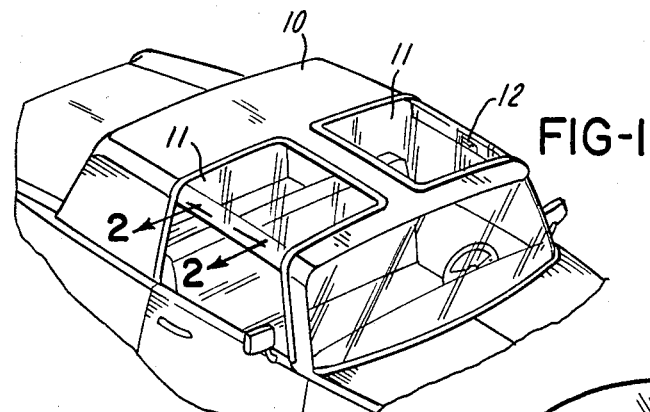
FIG-1
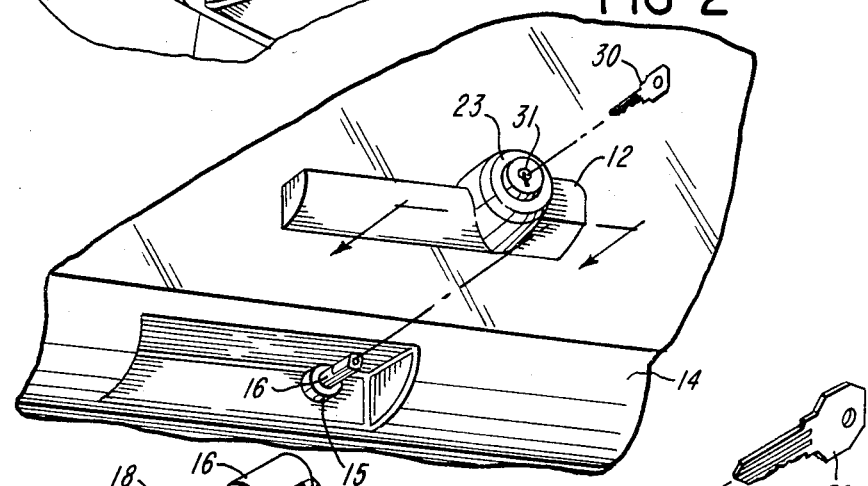
FIG-2
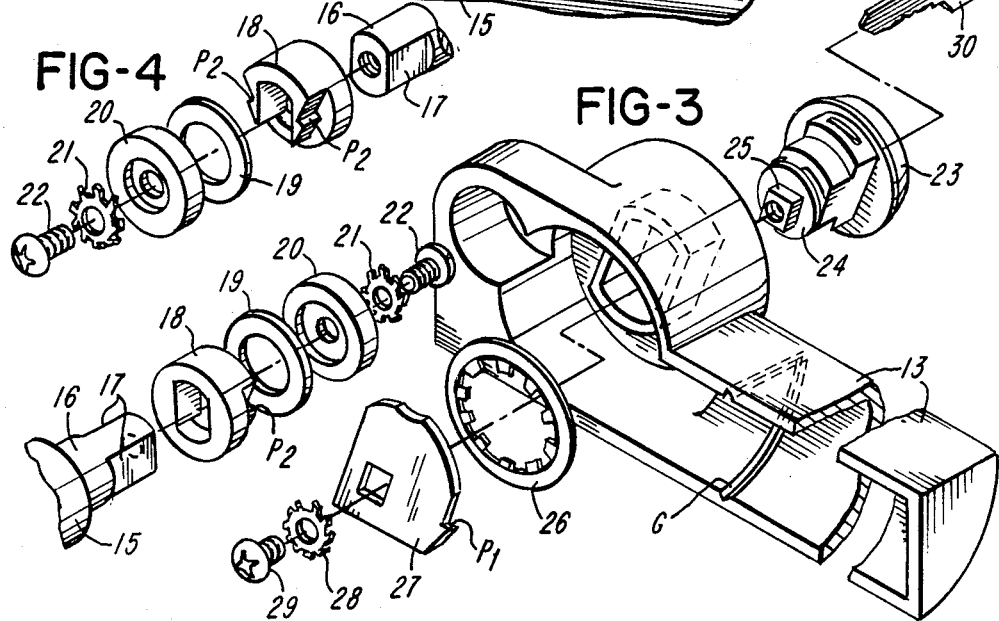
FIG-4
FIG-3

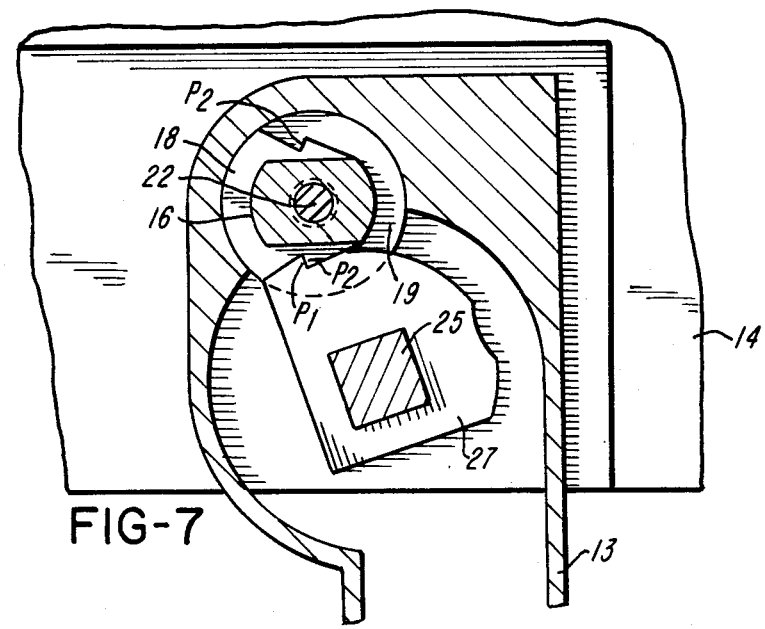
FIG-7
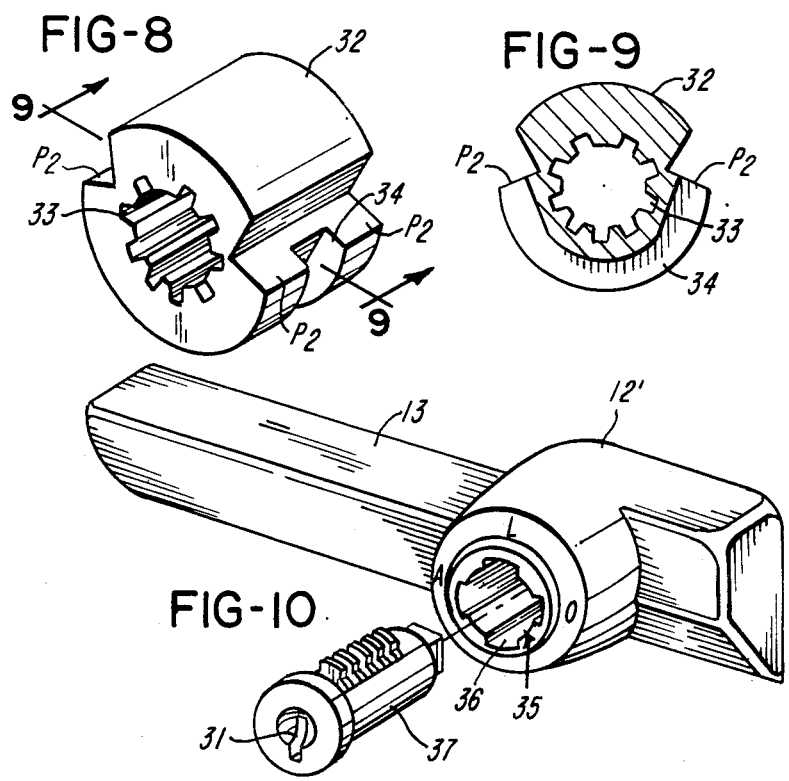
FIG-8
FIG-9
FIG-10

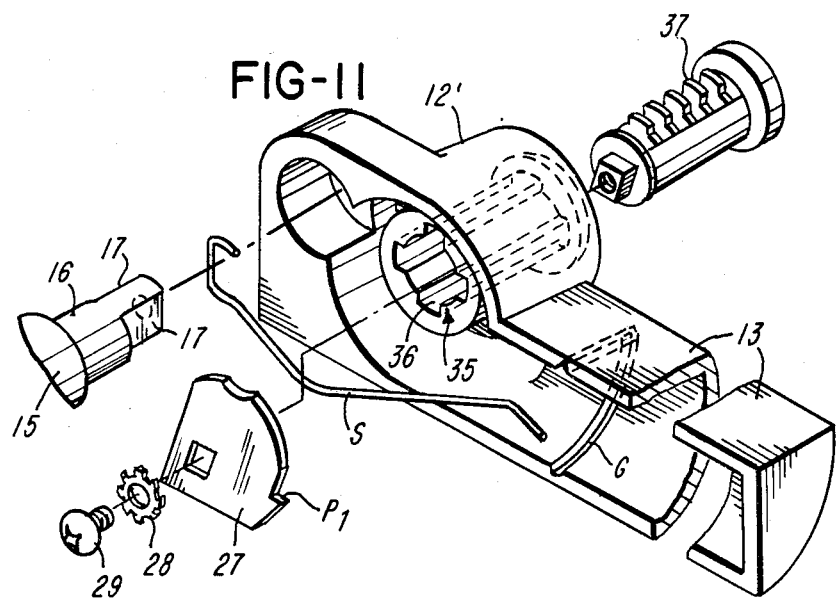

T-TOP LOCK-HANDLE

BACKGROUND OF THE INVENTION AND PRIOR ART

The adoption of various federal, state and related statutes, rules and regulations for automobiles has made the manufacture of convertibles very difficult and expensive. In order to circumvent these problems, the automobile manufacturers have introduced in place thereof what is called the "T-top". This "T-top" is a roof assembly having two openings in the front seat portion of the car. One opening is above and to the side of the driver and the other is above and to the side of the passenger in the front seat. Alternatively, the panels can be located only above the driver and passenger and need not extend to form a curved window portion positioned partially vertically with respect to the roof portion. In any event, these customarily glass or transparent plastic panels permit the driver and passenger to view the sky above when they are in place. When removed, they give the open air sensation of a conventional "rag top" convertible but are usually safer than such convertible in the event of a roll-over due to the fact that the additional steel or other roof reinforcement in the roof located between and around the "T-top" transparent panels permit the car to be substantially self-supporting when turned over on its roof. As mentioned, these glass or plastic panels are made to be easily removed from the openings in the roof so that they can be stored, for example, in the trunk of the vehicle thereby enableing the passengers to experience the open air sensation of the "rag top" convertibles.

These "T-top" type panels are usually provided with a metal channel about their outer periphery and a customary plastic housing which conceals the roof locking studs. These studs may be of the bayonet-type which, upon locking of the "T-top" panels in place, mate with openings in the vehicle roof to accomodate the positioning and locking of the "T-top" panels in the car roof structure. In accordance with prior art and conventional practice, "T-top" conventional latch mechanisms operate lateral bayonet lugs, clips, etc., which interlock with female lateral keepers in the automobile roof portion to hold the "T-top" panels in place. These latch mechanisms include a stud which protrudes through the housing to engage a handle.

Due to the fact that these "T-top" panels are intended and designed to be readily removable, great problems have been experienced by owners of such vehicles in theft of these panels. These "T-top" type transparent and removable panels are extremely expensive and there has been a need in the art to provide a reliable yet inexpensive locking mechanism which locks the "T-top" to the latch stud, particularly one which is readily adapted to retrofit into existing roof locking mechanisms.

One of the prior art patents seeking to deal with this problem in the McAdams, Sr., U.S. Pat. No. 4,302,045, which relates to an anti-theft mechanism for removable automobile roof panels. The McAdams, Sr., device includes a locking mechanism which engages a fixed post and a keeper bar to prevent removal of the keeper bar from the fixed part. The locking mechanism of McAdams, Sr., includes a nut which is threadably engaged with the fixed post and the keeper bar and a lockable housing which swivels on the fixed post and encloses the nut so that it cannot be removed.

The patents to Roudanez, U.S. Pat. No. 1,624,563; Maszczyk, U.S. Pat. No. 1,645,917; White, U.S. Pat. No. 1,678,174 and Reid, U.S. Pat. No. 3,800,574 each relate to locking handles which are threaded on a bolt and can freely rotate when not in a locked position.

U.S. Pat. No. 3,525,242 to Young illustrates a locking assembly comprising a bolt, a socket adapted to receive an end part of the bolt, a lining for the socket and detent means which is moveable to operative and inoperative positions.

Raleigh U.S. Pat. No. 1,628,740 relates to spare wheel locks for automobiles characterized generally as being screwed or otherwise rotated to locking position over a mounting member but which when in locked condition is free to be rotated without being released from the mounting member.

Bronson U.S. Pat. No. 3,525,461 is directed to a car top carrier structure with locking means wherein the structure includes a frame for the material which mounts transversely of the roof by a pair of clamps which are attachable with rain gutters on the sides of the automobile roof. A key operated lock on each clamping assembly prevents removal thereof in an unauthorized manner.

Corrado U.S. Pat. No. 3,699,787 is directed to a cover means for navagational instruments and radio equipment mounted on panels of aircraft including a cover provided with lock means that are arranged to coact with cooperating lock devices mounted on such aircraft instrument panel or other permanent structure of the aircraft so as to prevent removal of such cover from such panel and consequantly access to the instruments and equipment mounted thereon, thereby precluding their unauthorized removal or theft.

It will be observed that none of the foregoing patents disclose the lock-handle combination of this invention containing a three-way lock, a locking cam and a latch stud adapter associated in combination within a two position handle as will be more fully disclosed herein below.

BRIEF DESCRIPTION OF THE DRAWINGS

FIG. 1 is a perspective view illustrating the top of an automobile having two "T-top" panels.

FIG. 2 is a partially isometric perspective view taken along the line 2—2 of FIG. 1, showing a portion of the interior of the "T-top" and particularly the recess wherein the lock-handle combination of this invention, which locks onto the roof latch stud, is located. FIG. 2 shows a right-hand lock-handle combination, viz., one which opens with the handle moving from left to right.

FIG. 3 is an isometric view showing the various components located internally within the lock-handle combination.

FIG. 4 is an isometric view showing the various adapter components in position for assembly to permit adaptation (retrofit) of the lock-handle combination of this invention to a typical existing roof latch mechanism, as is shown in FIG. 2. The term handle-housing is used herein to point out that component 13 serves as both a handle and a housing (for the adapter and locking mechanism).

FIG. 7 is a partial sectional view as in FIG. 5 illustrating the open or unlocked position of the handle.

FIG. 8 is a perspective view showing a modification of the adapter mechanism wherein the adapter is formed in one piece and has internally located splines.

FIG. 9 is a cross sectional view taken along the lines 9—9 of FIG. 8.

FIG. 10 is an isometric perspective view illustrating a modification of the handle-lock mechanism having a built-in cylinder to accept a conventional lock cylinder, and;

FIG. 11 is an isometric view showing detail of the FIG. 10 modification for lock-handle combination 12' which is comparable to the FIG. 3 embodiment of lock-handle combination 12, but excludes the detail of the adapter components 18 through 22 for purposes of simplification. FIG. 11 also illustrates an optional torsion spring S. to maintain the handle in the horizontal position prior to unlocking.

DETAILED DESCRIPTION OF THE INVENTION

Figure 5:
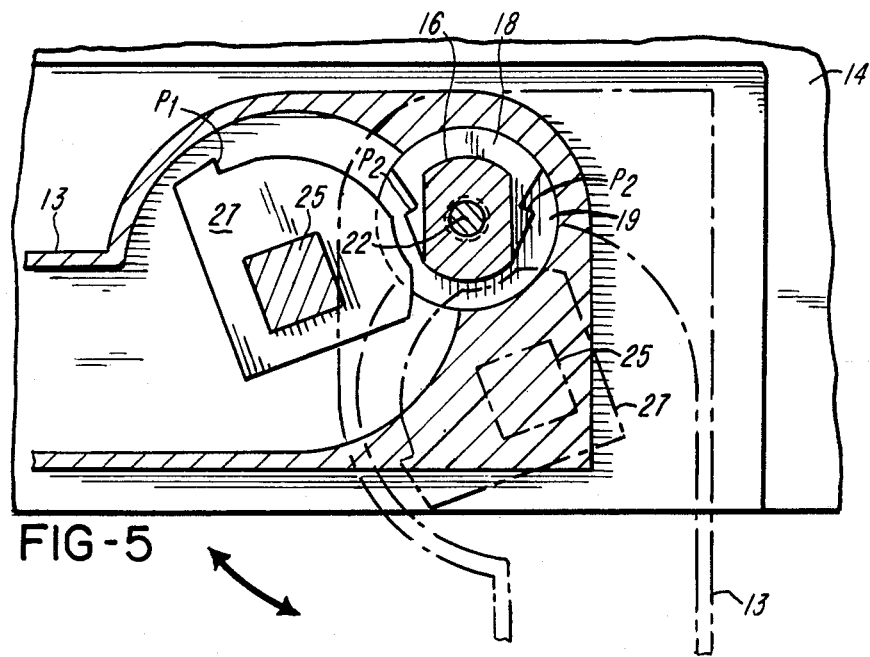
FIG. 5 is a cross-sectional view, taken along the line 5—5 of FIG. 2 illustrating the handle and portions of the internal locking mechanism both in horizontal position (solid line) and a vertical (phantom line) position showing the rotation of the handle-housing without unlocking.

Both the key and locking mechanism of the lock-handle combination device of this invention operate in the same number of a plurality of positions, usually three, over an arc which can range from about 60° to about 180°, usually approximately 180°, to define "assembly", "handle pivot but locked" and unlocked (open) positions whereas the handle thereof operates over a lesser degree arc, usually 90°, than said key and lock mechanism in a lesser plurality of positions, usually two.

In many of the existing "T-top" lock devices, the handle has a horizontal position, indicating locked to the observer, and a vertical position, indicating open or unlocked and the "T-top" panels can be removed from the roof when the handle is in the vertical position. With the device of this invention, however, when the handle is in the substantially vertical position, the "T-top" panels can be either locked or unlocked depending on the concealed position of the locking cam and adapter, both located within the device, as the former is responsive to the position of the key-locking mechanism.

The lock-handle device of this invention contains an internal locking cam which is cut or shaped in such a manner as to have one or more notches or surfaces $P_1$ which can mesh with corresponding notches or surfaces $P_2$ on the latch adapter 18 to drive same and permit opening the device.

According to this invention the key and locking mechanisms operate over three positions. The first or assembly position, usually at 0°, allows the handle to be positioned on the extended stud of the existing roof latching mechanism of the automobile. These studs protrude through recessed areas of covers covering the roof latching mechanism from view. In this first position, the handle clears the locking mechanism. In the second key position, usually spaced at approximately 90° from the first position in the case of a 180° arc, the locking mechanism is in locked position and the handle remains in a horizontal position although it can be moved (pivoted) to a vertical position. Such a vertical position is normally visually associated in prior devices with the "T-top" being unlocked and readily removable. In the present device, however, it cannot be removed because the opening mechanism (locking cam notch meshing with adjuster notch) is not in proper position. In the third, or opening (unlocked) key position, usually about 180° from the first position, with the handle in the horizontal position, portion $P_1$ of locking cam 27 engages notched portion $P_2$ of adapter 18 which is secured to latch stud 16 permitting unlocking and removal of the "T-top" upon rotating the handle 90°, viz., from the horizontal to vertical position. According to the present invention the deceiving vertical appearance of the handle, which is possible with the locking mechanism in the second position, tends to frustrate a would-be thief who could pivot the handle into the apparently unlocked (vertical) position yet be unable to remove the "T-top".

As will be seen from FIG. 1 of the drawings, automobile roof 10 contains a plurality, usually two, "T-top" panels 11 located in the roof vicinity thereof. These panels can be a varity of shapes including curved from the roof portion down to the side windows. Located internally within the passenger compartment on either side of the automobile front seat are the lock-handle combinations 12. These combinations contain the locking mechanism and the adapter mechanism the latter of which conforms, viz., retrofits, the lock-handle combination of this invention to shaped surfaces 17 of existing latch shafts or studs 16 (FIG. 2) present on typical "T-top" panels. Such latch studs 16 protrude through the covers 14 which conceal the roof locking mechanisms present in the typical existing "T-top" panels. In accordance with this invention the internal surface(s) or configuration of handle adapter 18 conforms with the exterior shape or configuration of stud 16 with surfaces 17, and with supporting mechanism permits attachment of the lock-handle combination to the protruding latch stud 16 on the existing "T-top" panel.

As will be observed from FIG. 2 of the drawings, the three-way barrel cam lock housing 23 is locked and unlocked by use of key 30 in key slot 31. FIG. 3 shows the assembly of the handle adapter 18 with its friction washwer 19, e.g., rubber, elastomer, plastic, etc., along with adapter top 20, lock washer 21 and screw 22, positioned so as to secure the handle, via the handle adapter and supporting mechanism, to the latch shaft or stud 16 shown to have flat surfaces 17 of a typical, existing "T-top" panel latch mechanism 15.

While FIG. 3 of the drawings shows the assembly from the point of the existing latch mechanism 15 through the handle adapter and the lock-handle casing (housing) 13 of the lock-handle combination 12; FIG. 4 shows the assembly of this handle adapter from the opposite side, viz., from the handle casing side 13 through to the existing latch mechanism 15. Again referring to FIG. 3 of the drawings, it will be observed that the three-way barrel cam lock housing 23 is secured within the handle-housing 13 as shown by the use of a locking ring 26. Washer 24 is placed over square tail portion 25 of housing 23. Tail portion 25 contains internal threading to accept locking screw 29 and orients locking cam 27 with the locking mechanism by fitting in a correspondingly shaped opening in cam 27 so the cam 27 moves with tail 25. Lock washwer 28 assists in setting and maintaining the screw position. Handle casing 13 can, and preferably is, provided with a "break-away" groove G such that pressure on the gripping part of housing 13 will cause it to break away from the remaining portions of the lock-handle combination before the locking itself breaks due to forcing. FIG. 3 illustrates the positioning of the lock cam 27 during assembly, viz., its assembly position.

FIG. 5 of the drawings shows the position of the lock as the handle is held in the horizontal position by friction of the friction washwer 19 in conjunction with the close fitting tolerance of the various portions of the lock. This permits the handle to rotate to a false open or unlocked position, viz., the phantom position shown in FIG. 5, but the latch does not activate to permit opening of the lock and removal of the "T-top" panel. Thus FIG. 5 shows in phantom the second position of the lock mechanism of this invention, the first position being the position of assembly, with the mechanism in locked position.

Figure 6:
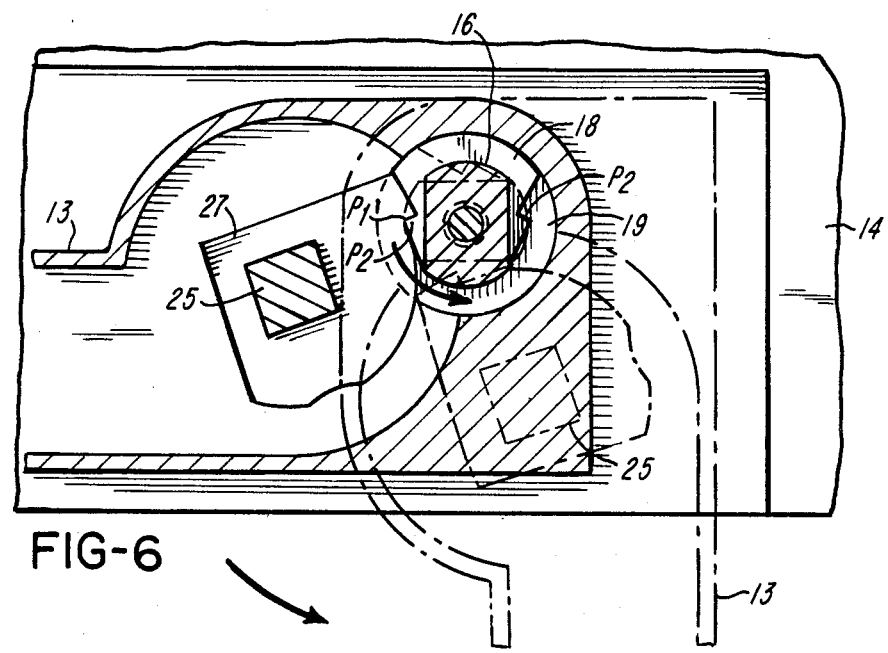
FIG. 6 is a sectional view as in FIG. 5 which illustrates the locking cam notch $P_1$ being engaged in meshing with and driving the notch $P_2$ of the adapter 18 so that when the handle-housing is rotated to the phantom position the adapter and latch mechanism are activated, permitting "T-top" removal.

FIG. 6 shows the third position of the lock wherein the notch $P_1$ of the locking cam 27 is engaged in driving the notch $P_2$ of the adapter 18. When the handle-housing 13 is rotated to the phantom position shown in FIG. 6, the adapter 18 and the latch mechanism stud 16 are activated to the open, viz., unlocked, position which is shown in phantom in FIG. 6 and in the full view of FIG. 7. Thus it will be observed that although there are three positions taken by the key and the lock in which the key is inserted, there are only two handle positions. The second position of the handle can be the same during both the second and third positions of the lock. As mentioned previously, this gives the impression that the handle occupies the open or unlocked position whereas the "T-top" panel cannot be removed with the locking mechanism in its second position.

The present invention is capable of wide variation, both in respect of the nature of the material of which the various parts are made and also in respect of the shape and configuration of the various parts, and whether or not the parts are joined and made integral or separate. Thus the handle housing can be aluminum, zinc, high impact plastic, chrome-plated zinc alloy, steel, made from powdered metal, combinations of metal and plastic, etc.

Similarly, the handle may have a cylinder and/or barrel portion of the lock mechanism cast into it as shown in the modification of FIGS. 10 and 11 wherein the lock-handle combination 12 has a built-in (cast) cylinder housing 35 for the barrel with a plurality of slots 36 to accomodate a conventional lock cylinder 37 having its key slot 31 for operation thereof. Comparing lock-handle modification 12' of FIG. 11 with lock-handle embodiment 12 of FIG. 3, both have three key and lock positions with two handle positions and operate under the same principle of this invention, viz., notch or surface $P_1$ of locking cam 27 engages and drives notch or surface $P_2$ of adapter 18 (not shown in FIG. 11) to open. However, in the modification of FIGS. 10 and 11, components 23 and 25 of FIG. 3 are replaced by a conventional lock barrel-tumbler cylinder arrangement or insert 37 and the cylinder housing 35 with its slots 36 is cast in and made integral with the handle housing 13. Locking ring 26 of FIG. 3 is eliminated in the structure of FIGS. 10 and 11. Insert 37 has a square tail 38 with internal female threads comparable to 25 of FIG. 3. Thus the barrel-tumbler insert 37 (FIGS. 10 and 11) and its counterpart in FIG. 3 (component 23) provide alignment means to permit positioning of the locking cam 27 in response to the various key positions.

Also, the adapter 18 can be made integral with the latch shaft 16, and the male member portion of the shaft, viz., coming out from the "T-top" latch mechanism, can be serrated, splined, round, rectangular, squared, part round and part squared and/or rectangular, oblong, round having a set screw, etc. In short, this male shaft or stud 16–17 can be of any geometric shape or configuration with the adapter being either female shaped to conform thereto or made in any shape and configuration with some form of keeper adapted to keep the stud in fixed position on the adapter mechanism. For example, as will be apparent from FIGS. 8 and 9 of the drawings, adapter 32 can be a one-piece adapter having a splined hub 33 and a slot, e.g., a substantially hemispherical slot, 34, to permit fitting onto a correspondingly shaped male shaft or stud coming from the existing latch mechanism of the "T-top" panel.

It should be apparent that although the drawing figures illustrated in FIGS. 2 through 7 of the present drawings illustrate a right hand operated handle, a reversal of the various parts and positions can just as will be employed to accomodate the left-hand operated handles on the opposite side of the vehicle. Although the attachment means shown in FIGS. 3 through 7 of the present drawings illustrate the use of screw means to attach the various lock and adapter mechanisms to the existing "T-top" latch mechanisms; it should be apparent that in place of the screw and nut means shown, rivets, clips and other equivalent attachment means can be employed just as well.

As shown in FIG. 10 of the drawings, and this also applies to the embodiment of FIG. 3, the barrel cam lock housing has basically three positions. The first position or position A is the position occupied by the locking mechanism upon assembly. Then 90° spaced therefrom is the locking position L. Finally, there is the open position O located 180° from the assembly position A. In accordance with this invention a torsion spring S (FIG. 11) can be added to maintain the handle slippage in the 90° horizontal (unlocked) position. Such spring can be attached to stud 16 and extends within the handle-housing 13 to hold the handle-housing in a horizontal position.

I claim:

1. A "T-top" lock-handle combination wherein both the key and locking mechanisms operate in three positions but the handle operates in two positions comprising a latch stud adapter mechanism including a friction washer permitting its handle-housing to rotate to a false open (false unlocked) position and including an adapter having an internal configuration which mates with the external configuration of a latch stud mounted in a vehicle roof; notches or surfaces and means to secure said adapter to said latch stud on one end; means to secure another end of said adapter mechanism to one portion of a lock handle-housing which encase locking, locking cam and adapter mechanisms, and wherein said locking mechanism and locking cam operate over an arc from locked to unlocked ranging from about 60° to about 180° whereas said handle housing operates over an arc of about 90° in two positions; said locking mechanism being located within said lock-handle housing and including a locking cam having notches or surfaces responsive in movement to key-operated alignment means to position the locking cam in response to three key positions such that operation of the key from locked to false unlocked (handle pivot but locked) to unlocked positions causes the locking cam notches or surfaces to engage mating notches or surfaces of said adapter to drive same to permit removal of said "T-top" upon rotation of the handle housing to unlocked position.

2. A "T-top" lock-handle combination as in claim 1 wherein said adapter has two notches or surfaces.

3. A "T-top" lock-handle combination as in claim 1 wherein said handle-housing has a break away groove such that pressure on the gripping part thereof will cause it to break away from the remaining portion thereof before the locking mechanism breaks due to forcing.

4. A "T-top" lock-handle combination as in claim 1 wherein said handle-housing has therein an opening having a plurality of slots to receive a barrel-tumbler insert and said locking mechanism includes a barrel-tumbler insert.

5. A "T-top" lock-handle combination as in claim 1 wherein said adapter has a splined internal configuration capable of mating with a splined latch stud.

6. A "T-top" lock-handle combination as in claim 1 which includes a torsion spring to maintain handle slippage in an unlocked position.

7. A "T-top" lock-handle combination as in claim 1 wherein one end of said locking mechanism has a tail portion which is of mating configuration with a shaped opening in said locking cam.

* * * * *